United States Patent [19]

Palmer et al.

[11] 4,312,614
[45] Jan. 26, 1982

[54] SECURITY FASTENER

[75] Inventors: John P. Palmer, Reading; Alfred E. C. Piper; Richard J. Harris, both of Basingstoke, all of England

[73] Assignee: ITW Limited, Windsor, England

[21] Appl. No.: 95,826

[22] Filed: Nov. 19, 1979

[30] Foreign Application Priority Data

Nov. 21, 1978 [GB] United Kingdom ............... 45511/78

[51] Int. Cl.³ ...................... A44B 17/00; F16B 13/04
[52] U.S. Cl. .................................. 411/44; 24/208 A; 24/297; 411/41; 411/508
[58] Field of Search .......................... 85/80, 81, 82, 83; 24/73 P, 73 PF, 73 PD, 208, 297; 411/41, 44

[56] References Cited

U.S. PATENT DOCUMENTS

| | | | |
|---|---|---|---|
| 2,358,578 | 9/1944 | Keehn | 85/82 |
| 2,948,937 | 8/1960 | Rapata | 85/82 X |
| 3,153,975 | 10/1964 | Rapata | 85/80 |
| 3,186,049 | 6/1965 | Fiddler | 85/80 |
| 3,350,976 | 11/1967 | Topf | 85/83 X |
| 3,417,438 | 12/1968 | Schuplin | 24/73 PF |
| 3,469,493 | 9/1969 | Fisher | 85/80 X |
| 3,678,798 | 7/1972 | Van Niel | 85/81 |
| 3,779,374 | 12/1973 | Bockenspette | 85/80 |
| 4,122,583 | 10/1978 | Grittner | 85/81 X |

FOREIGN PATENT DOCUMENTS

| | | | |
|---|---|---|---|
| 2830415 | 1/1979 | Fed. Rep. of Germany | 411/508 |
| 83881 | 9/1964 | France | 411/548 |
| 52-18564 | 2/1977 | Japan | 411/548 |

Primary Examiner—Thomas J. Holko
Attorney, Agent, or Firm—J. R. Halvorsen; T. W. Buckman

[57] ABSTRACT

There is described a tamper-proof fastener for use in security applications, the fastener comprising inner and outer members interconnected by flexible straps. The inner and outer members each comprise a leading end, a shank, and a trailing end, the shank of the outer member consisting of two substantially parallel legs defining between them an open-sided passage which contracts towards the leading end, and the leading end of the outer member consisting of two limbs which define between them an open-sided space and converge to a tip where they are interconnected, each limb being connected to a respective leg and presenting an external shoulder facing away from the tip and an internal shoulder facing towards the tip, the trailing end of the outer member including outwardly extending portions presenting an external shoulder facing the leading of the outer member. The inner member is initially positioned so that its leading end lies in the open-sided passage, the leading of the inner member is capable of moving longitudinally to a position within the leading end of the outer member, shoulders formed on the leading end of the inner member then engaging the internal shoulders of the outer member to resist removal of the leading end of the inner member from the leading of the outer member.

12 Claims, 13 Drawing Figures

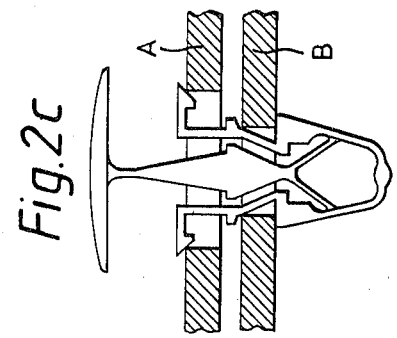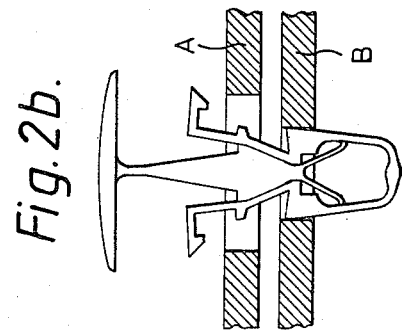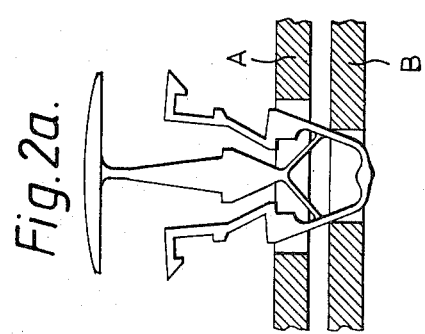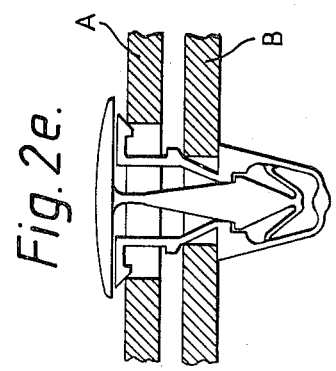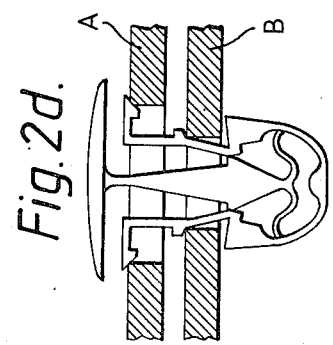

SECURITY FASTENER

The invention relates to fasteners, most particularly fasteners for use in security applications to prevent tampering with the contents of a sealed container.

It is currently the practice of some large chain stores to distribute merchandise, cash vouchers, and other valuable items amongst their branches by transporting these items in sealed containers. These containers, in a particular instance, take the form of plastics trays which have a base, and upstanding sidewalls with outwardly extending flanges at their upper ends. To these trays are attached flat lids, which have depending flanges to surround the flange on the tray. Various devices currently used to seal the lids to the trays involve aligned holes formed in the lid and the tray flange, through which seals are passed to grip both the walls of the holes and the surface of the lid and tray flange.

These devices often damage the holes, especially during their removal on unsealing the tray, rendering the tray unusable after a comparatively short life.

The present invention seeks to provide a security sealing device which can be applied without special tools, which is easily removed when required, cannot be removed undamaged, and will not damage the tray or lid either in application, use, or removal.

According to the present invention, a tamper-resisting fastener for insertion through two aligned circular holes comprises an inner member and an outer member each having a leading end, a shank, and a trailing end, the shank of the outer member consisting of two substantially parallel legs defining between them an open-sided passage which contracts towards the leading end, and the leading end of the outer member consisting of two limbs, which define beween them an open-sided space and converge to a tip where they are interconnected, and which are each connected to a respective leg and present an external shoulder facing away from the tip and an internal shoulder facing towards the tip, and the trailing end of the outer member including outwardly extending portions presenting an external shoulder facing the leading end of the outer member, the leading end of the inner member being capable of fitting in the space within the leading end of the outer member, with shoulders on the inner member co-operating with the internal shoulders on the outer member, the length of the shank of the inner member being such that the trailing end of the inner member is positioned adjacent the trailing end of the outer member when the leading end of the inner member is within that of the outer member, the inner and outer members being joined by flexible straps extending from the leading end of the inner member to the limbs of the leading end of the outer member, the two members and the straps being an integral moulding of plastics material.

In an alternative embodiment, a second pair of straps may be provided, the second pair of straps extending from the shank or trailing end of the inner member to join the outer member at the junction of its shank and its trailing end.

In a further alternative embodiment, the shoulders on the inner member are located at the extremities of a pair of resilient arms which extend obliquely outwardly from the leading end of the inner member, the arms diverging in the direction towards the trailing end of the inner member.

In yet another alternative embodiment, the trailing end of the outer member is formed as a disc-shaped head, and the trailing end and shank of the inner member are formed as a simple rod, the head of the outer member having an aperture through which the shank and trailing end of the inner member project. The length of the shank of the inner member is so adjusted that, when the fastener is set, the trailing end of the inner member lies flush with, or slightly below the exposed surface of the head.

The cross-sectional shapes of the aperture and the shank of the inner member are preferably arranged to be complementary and non-circular, in order to resist relative rotation of the inner and outer members, which might disengage the shoulders of the inner member from the internal shoulders of the outer member.

Two embodiments of the invention will now be described in detail, with reference to the accompanying drawings, in which:

FIG. 2a to 2e show stages in the insertion of the fastener of FIG. 1 in two aligned apertures.

Figure 1:
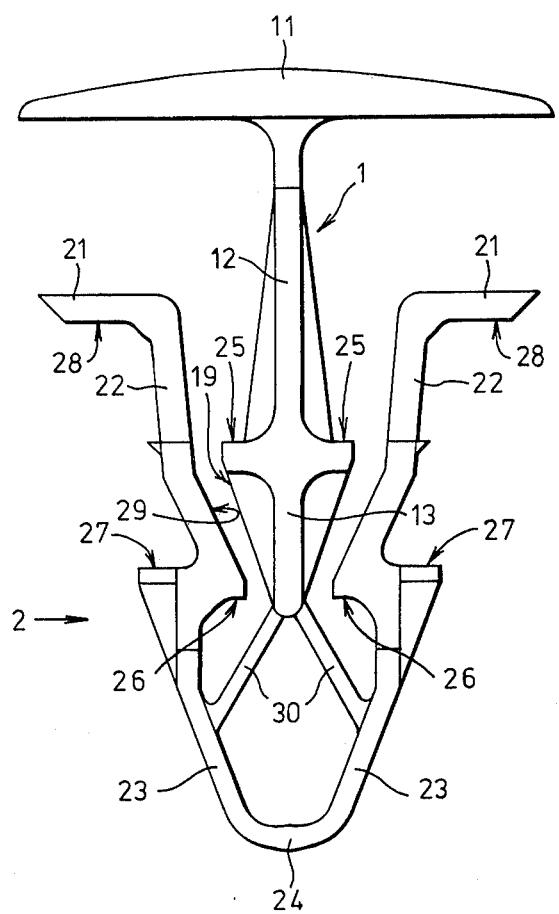
FIG. 1 is a side elevation of a first fastener.

Referring now to FIG. 1, the fastener shown comprises an inner member 1 and an outer member 2, the inner member 1 having a head 11 at its trailing end, a shank 12 and a leading end 13.

The outer member has a trailing end with outwardly extending shoulders here constituted by two lugs 21, a shank constituted by two legs 22 and a leading end formed as two limbs 23 joined at the extreme tip 24 of the fastener.

Two flexible straps 30 extend from the leading end 13 of the inner member 1 to the interior surfaces of the limbs 23.

The leading end 13 of the inner member has shoulders 25 facing towards the head 11, and the leading end of the outer member includes internal shoulders 26 facing away from the lugs 21.

The outer member 2 also has opposing external shoulders 27 and 28, which in use engage two panels which are to be retained by the fastener.

FIGS. 2a to 2e show stages in the application of the fastener to secure two apertured panels A and B. To apply the fastener, the apertures are aligned and the leading end of the outer member is introduced into the apertures, as seen in FIG. 2a. The inclined limbs 23 of the outer member's leading end are urged together by the sides of the aperture in panel B, as seen in FIG. 2b, when finger pressure is exerted on the head 11 of the inner member, the force being transmitted to the outer member by the straps 30 acting as struts.

The urging together of the limbs 23 enables the leading end of the outer member to pass through the apertures in the panels, whereupon the limbs of the outer member spring apart due to their resilience, causing the shoulders 27 to engage the surface of panel B.

The length of the legs 22 of the shank of the outer member is arranged so that when the shoulders 27 engage panel B, then the shoulders 28 on the lugs 21 of the head of the outer member engage the surface of panel A, as shown in FIG. 2c.

In order finally to set the fastener, further pressure is exerted on the head 11 of the inner member. This causes the straps 30 to buckle, allowing the inner member 1 to move relatively to the outer member 2. As can be seen in FIG. 2d, the inclined surfaces 19 of the leading end 13 of the inner member engage with the surfaces 29 of the legs of the outer member, and urge the limbs 23 of the outer member's leading end to spread again; this enables the leading end of the inner member to move to a position within the leading end of the outer member as seen in FIG. 2e, the shoulders 25 and 26 engaging when the limbs 23 resume their positions shown in FIG. 2c. The resilience of the limbs is aided at this stage by a toggle action displayed by the straps 30 in returning the limbs to their earlier position.

The length of the shank 12 of the inner member is arranged so that when shoulders 25 and 26 come into engagement, the underside 18 of the head 11 engages the lugs 21 to prevent all further relative movement between the inner and outer members.

Figure 3:
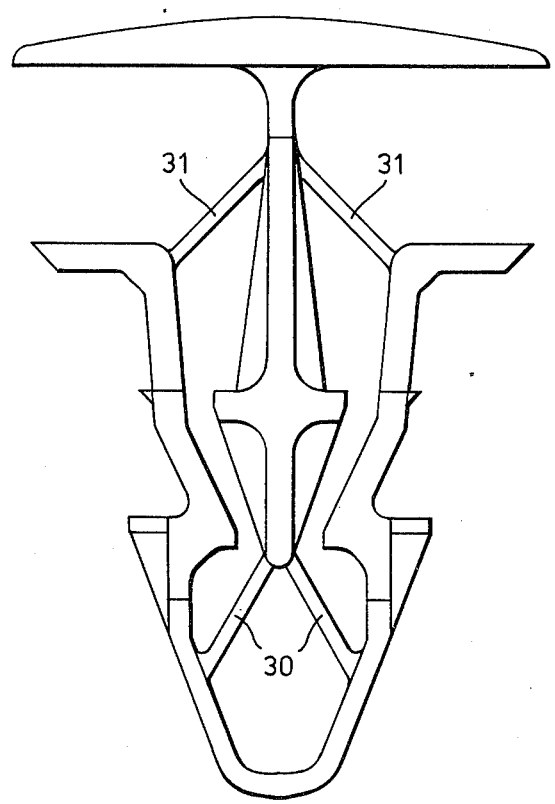
FIGS. 3 and 4 show a second embodiment of the fastener in the as-moulded and set conditions respectively.

It is important that during insertion the legs 22 of the outer member be spread apart, to ensure that the head of the outer member engages the panel A. If this engagement is not achieved, there is a chance that the outer member will pass through panel A. In this situation, with the shoulders 28 of the outer member engaging panel B, it is impossible to set the fastener, as the head 11 of the inner member cannot pass through the aperture in Panel A. To avoid this eventuality, the fastener seen in FIG. 3 is used. During insertion the action of the second pair of straps 31 is to urge the legs 22 apart while transmitting the inserting force from the head 11 of the inner member.

Figure 4:
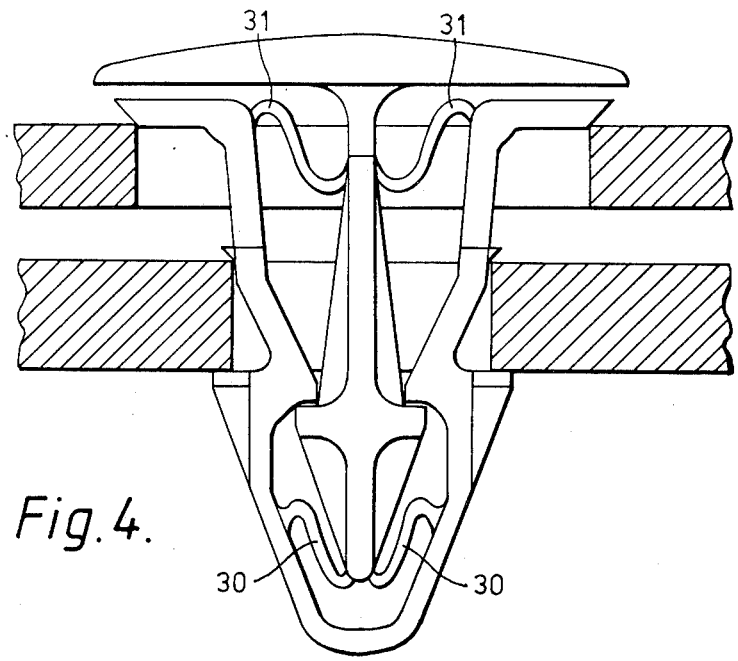

When the fastener is set, the straps 31 take up the positions shown in FIG. 4.

The fastener can, of course, be produced with straps only at the positions of straps 31 in FIG. 4, but this is not a preferred form. The embodiment having two pairs of straps is more satisfactory.

The straps 31 could, of course extend from the underside of the head 11 rather than from the shank 12 to the head of the outer member.

Figure 5:
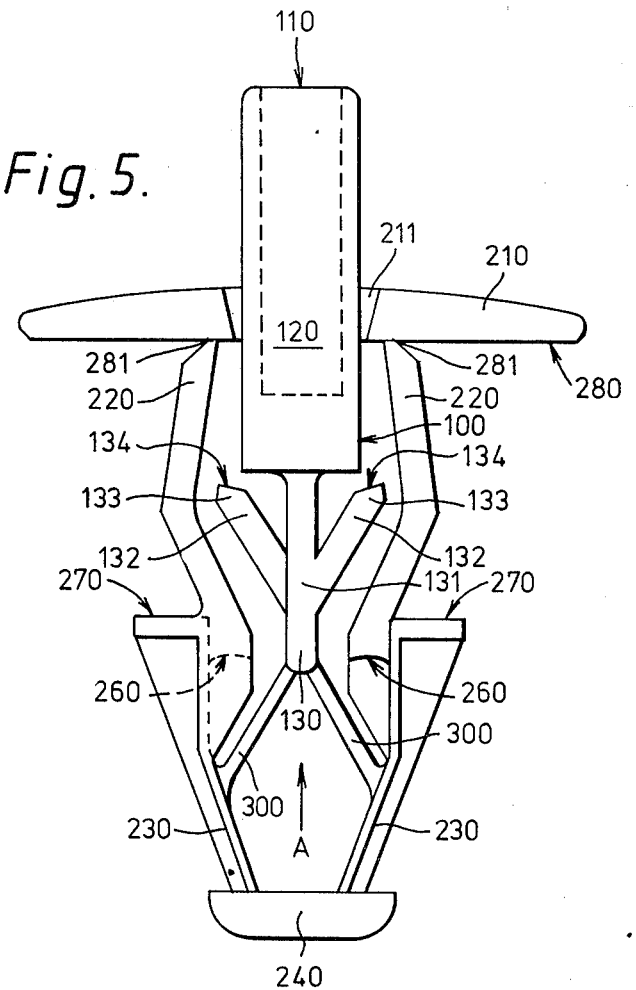
FIG. 5 shows a side view of a third, preferred embodiment of the invention in its as-moulded configuration.

The preferred embodiment of the invention is shown in FIG. 5, and is applied in a similar way to the previously described fastener. The trailing end of the outer member is formed as a circular disc-shaped head 210 with a central aperture 211. Through the aperture 211 extends part of the thickened shank 120, and the trailing end 110 of the inner member 100.

The leading end 130 of the inner member has an elongate central plate 131, extending axially from the shank 120. Two planar cantilever arms 132 extend obliquely from the faces of the plate 131, the arms diverging towards the shank to form an "arrowhead" configuration when viewed from the side. At the free ends 133 of the arms are shoulders 134 facing away from the leading end of the inner member.

The outer member of the fastener has a shank constituted by two lugs 220, which extend from the underside of the head 210, joining the head on opposite sides of the aperture 211.

The leading end of the outer member of the fastener is similar to the fastener shown in FIGS. 1 to 4, having two converging limbs 230 joined together at the extremity of the fastener to a disc-shaped nosepiece 240. Each of the limbs at its end remote from the nosepiece 240 joins one of the legs 220 of the shank.

Internal shoulders 260 facing the nosepiece are formed on the respective limbs of the leading end of the outer member adjacent their junctions with the legs 220 of the shank, and two straps 300 extend obliquely from the extremity of the inner member to join the internal surfaces of the limbs 230 at points intermediate the nosepiece 240 and the shoulder 260 of each limb.

Figure 7:
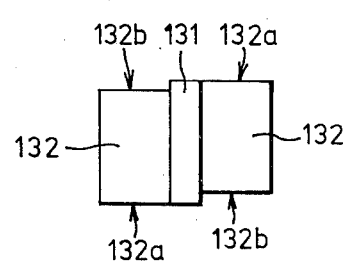
FIG. 7 is a view of the inner member of the fastener of FIGS. 5 and 6, seen in the direction of arrow A of FIG. 5.

An advantageous feature of the preferred fastener is that the cantilever arms 132 of the leading end of the inner member are slightly offset laterally one from the other as can be seen from FIG. 7. Each of the arms 132 has one edge 132a flush with the edge of the central plate 131, and one edge 132b slightly inset therefrom.

Figure 8:
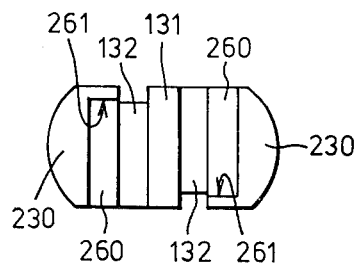
FIG. 8 is a detail view of the internal shoulders of the outer member of FIGS. 5 and 6, seen in the direction of arrow A of FIG. 5.
Figure 9:
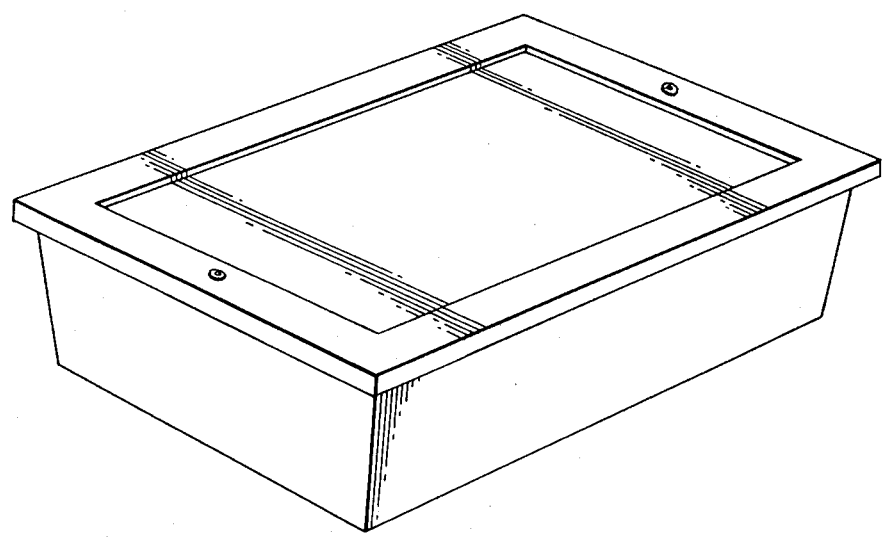
FIG. 9 shows a typical tray and lid in the assembled condition, with the fasteners inserted to deter tampering.

As can be seen from FIG. 8, the shoulders 260 each have an abutment surface 261 at one of their sides, the abutment surfaces 261 facing in opposite directions and being in planes parallel to the edges 132b of the arms 132 of the inner member.

Figure 6:
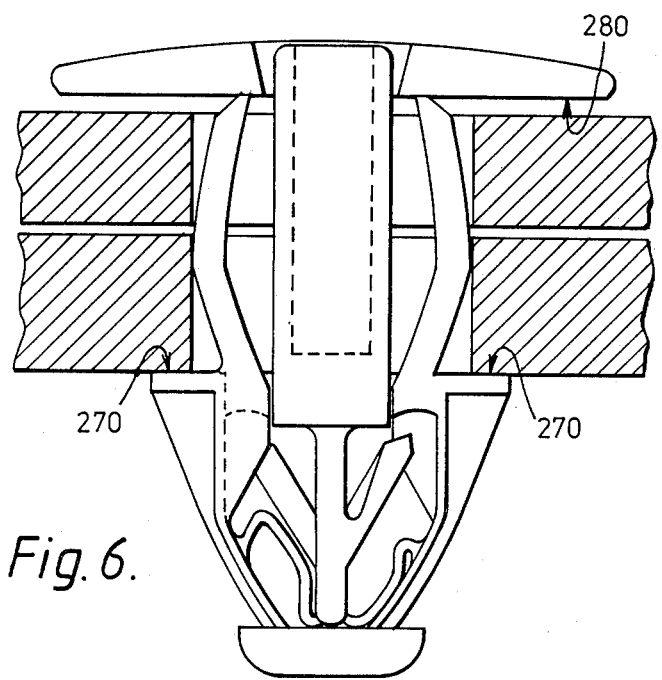
FIG. 6 shows the fastener of FIG. 5 in position in a tray securing the lid of the tray.

To apply the fastener to two apertured panels the apertures are first aligned, as seen in FIG. 6, and the nosepiece 240 is inserted, in this case downwardly, into the aligned apertures. Pressure on the trailing end 110 of the shank 120 of the inner member is transmitted, via the straps 300 acting as struts, to the outer member and thus urges it into the apertures. Engagement of the aperture walls with the tapered limbs 230 causes the outer member to contract laterally, as described in relation to the previous embodiments, and the resilience of the fastener material ensures that the shoulders 270 expand laterally when they emerge from the apertures to engage the undersurface of the lower panel.

Continued pressure causes the underside 280 of the head 210 to contact the upper surface of the upper panel to arrest the movement of the outer member.

The inner member is then moved downwardly, the resilient arms 132 flexing towards each other until their free ends pass below the shoulders 260 of the outer member whereupon their resilience springs them apart to set the fastener.

When the fastener is set as shown in FIG. 6 the shoulders 134 of the inner member engage shoulders 260 of the outer member and edges 132b of the arms of the inner member engage the abutment surfaces 261. This engagement ensures that the inner member can neither be directly withdrawn in the direction of arrow A, nor can it be displaced laterally to bring the shoulders 134 out of engagement with the shoulders 260 to enable withdrawal to occur. Relative rotation of the inner and outer members is prevented by the complementary, non-circular configurations of the aperture 211 and the shank 120.

As with the embodiment previously described the fastener when set secures two panels together, and cannot be removed intact. The panels, as seen in FIG. 6, are held between external shoulders 270, on the shank legs of the outer member, and the underside 280 of the head 210 of the outer member. The shank 120 of the inner member is configured so that, in the set position of the fastener, lateral contraction of the shoulders 270 is prevented by the interposition of the inner member between the shank legs of the outer member at this point.

To reduce the amount of material necessary to produce the fastener, the shank 120 may be made hollow for the majority of its length, the part of the shank which lies between the shoulders 270 in the final configuration of the fastener being left solid better to resist any tendency for the shoulders 270 to move together.

The preferred fastener is released by breaking off the head 210 of the outer member. This is facilitated by notches 281 formed at the junctions of the legs 220 of the shank and the underside 280 of the head. The notches 281 act as stress-concentrators to ensure a clean, predictably positioned failure.

The fasteners are advantageously injection moulded from plastics material, a preferred material being Nylon 66.

In addition to their security role, it is possible to use the fastener to secure panels together, or to attach trim to structural parts.

We claim:

1. A fastener comprising an inner member and an outer member each having a leading end, a shank, and a trailing end, the shank of the outer member consisting of two substantially parallel legs defining between them an open-sided passage which contracts towards the leading end, and the leading end of the outer member consisting of two limbs, which define between them an open-sided space and converge to a tip where they are interconnected, and which are each connected to a respective leg and present an external shoulder facing away from the tip and an internal shoulder facing towards the tip, and the trailing end of the outer member including outwardly extending portions presenting an external shoulder facing the leading end of the outer member, the leading end of the inner member being capable of fitting in the space within the leading end of the outer member, with shoulders on the inner member cooperating with the internal shoulders on the outer member, the length of the shank of the inner member being such that the trailing end of the inner member is positioned adjacent the trailing end of the outer member when the leading end of the inner member is within that of the outer member, the inner and outer members being joined by flexible straps extending from the leading end of the inner member to the limbs of the leading end of the outer member, the two members and the straps being an integral moulding of plastics material.

2. A fastener according to claim 1, in which the trailing end of the outer member comprises two outwardly extending lugs, each lug situated at the extremity of a respective one of the legs of the shank.

3. A fastener according to claim 2 in which the trailing end of the inner member extends radially outwards at least as far as the lugs of the outer member.

4. A fastener according to claim 3 in which the trailing end of the outer member is joined to the shank of the inner member by a second pair of flexible straps, the straps extending from the shank of the inner member obliquely outwardly and towards the leading end of the fastener in the unset condition.

5. A fastener according to claim 1 in which the trailing end of the outer member comprises a substantially planar head from one side of which the legs of the shank of the outer member extend, the head being formed with an aperture situated between the junctions of the legs to the head, the shank of the inner member passing through the aperture when the fastener is in the unset condition.

6. A fastener according to claim 5 in wich notches are formed in the legs of the outer member at their junctions with the head.

7. A fastener according to claim 6 in which the cross-sectional shape of the shank of the inner member is complementary with the shape of the aperture.

8. A fastener according to claim 5 in which the cross-sectional shape of the shank of the inner member is non-circular.

9. A fastener according to claim 8 on which the shank of the inner member is hollow for a part of its length.

10. A fastener according to claim 1 in which the leading end of the inner member comprises a central plate extending from the shank and two cantilever arms extending obliquely one from each side of the plate and diverging towards the shank, the free ends of the cantilever arms constituting shoulders facing away from the leading end of the inner member.

11. A fastener according to claim 10 in which the cantilever arms are offset laterally with respect to each other.

12. A fastener according to claim 11 in which the outer member includes two longitudinally extending abutment surfaces, those abutment surfaces extending from opposite lateral ends of the internal shoulders formed on the limbs of the outer member towards the tip.

* * * * *